United States Patent
Ng

(10) Patent No.: US 7,948,114 B2
(45) Date of Patent: May 24, 2011

(54) APPARATUS AND METHOD FOR PROVIDING A POWER SWITCH ARRAY WITH ADJUSTABLE CURRENT RATING POWER SWITCHES

(75) Inventor: Chee Yu Ng, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 197 days.

(21) Appl. No.: 12/324,273

(22) Filed: Nov. 26, 2008

(65) Prior Publication Data

US 2010/0127568 A1     May 27, 2010

(51) Int. Cl.
*H02J 3/14*     (2006.01)
(52) U.S. Cl. ........................................ 307/32
(58) Field of Classification Search .............. 307/30–50; 713/320; 700/297, 298
See application file for complete search history.

(56) References Cited

U.S. PATENT DOCUMENTS 4,187,482 A * 2/1980 Kosup .............................. 335/12
7,612,524 B2 * 11/2009 Howell et al. ................. 320/104

FOREIGN PATENT DOCUMENTS

DE    4025887     * 2/1992
GB    2212663     * 7/1989

* cited by examiner

*Primary Examiner* — Albert W Paladini
(74) *Attorney, Agent, or Firm* — Lisa K. Jorgenson; William A. Munck

(57) ABSTRACT

An apparatus and method are disclosed for providing a power switch array with adjustable current rating power switches. A plurality of current rating power switches is provided that connects a power supply unit to a plurality of device ports. A power switch array controller is provided that adjusts an adjustable current rating in each of the plurality of adjustable current rating power switches. Each of the plurality of adjustable current rating power switches is adjustable to a selected number of current values. The power switch array controller dynamically adjusts the current ratings in the adjustable current power switches as required by the current requirements of the device ports.

20 Claims, 2 Drawing Sheets

APPARATUS AND METHOD FOR PROVIDING A POWER SWITCH ARRAY WITH ADJUSTABLE CURRENT RATING POWER SWITCHES

TECHNICAL FIELD

This disclosure relates generally to the field of electronic power supplies and more specifically to an apparatus and method for providing a power switch array that comprises power switches that have an adjustable current rating.

BACKGROUND

Many modern computer based devices are equipped with a variety of different types of ports for external devices. Such ports include the USB (Universal Serial Bus) port, the Firewire port, and memory card slots. These types of ports provide a power supply to the device to which they are connected.

In systems that comprise a plurality of ports (sometimes more than six (6) ports) allocating the maximum required current rating for each of the plurality of ports may place a very high power requirement on the power supply unit of the system. Consider, for example, the exemplary prior art system 100 that is illustrated in FIG. 1.

The power supply unit 110 of the system 100 provides power to a power switch 120. The power switch 120 has a current rating of one and one half amperes (1.5 A). That means that the power switch 120 is designed to carry a maximum current of one and one half amperes (1.5 A).

The output of the power switch 120 is connected to an input of Port 1 (designated with reference numeral 130) and to an input of Port 2 (designated with reference 140) and to an input of Port 3 (designated with reference numeral 150). Each of the three ports (130, 140, 150) is connected to a separate USB device (not shown in FIG. 1). The USB standard specifies a minimum current of five hundred milliamperes (500 mA) for each port. A five hundred milliampere (500 mA) current is marginal at best for supporting an external USB hard disk.

In the prior art system 100 the power switch 120 has a current rating that is high enough to handle current for each of the three ports (130, 140, 150). The power switch 120 is designed to carry a maximum current of one and one half amperes (1.5 A). Each of the three ports (130, 140, 150) is also designed to carry a maximum current of one and one half amperes (1.5 A).

In response to control signals (not shown in FIG. 1) the power switch 120 sequentially switches power to each of the three ports (130, 140, 150). There is a problem with this arrangement in that if one of the USB devices that is connected to one of the three ports (130, 140, 150) attempts to draw more current than one and one half ampere (1.5 A), then the power switch 120 turns off. When the power switch 120 turns off it abruptly cuts off the supply of power to all the USB devices that are connected to the three ports (130, 140, 150). The cutoff of power could be disastrous for hard disk devices.

There is another problem with this arrangement if one of the USB devices that is connected to one of the three ports (130, 140, 150) malfunctions and continuously draws a current of one and one half (1.5) amperes. In this case there is no protection action from the power switch 120.

A second approach is illustrated in the exemplary prior art system 200 that is shown in FIG. 2. The power supply unit 110 of the system 200 provides power to three different power switches 210, 220 and 230. The power switches 210, 220 and 230 are connected in parallel as shown in FIG. 2. Each of the three power switches 210, 220 and 230 has a current rating of one and one half amperes (1.5 A). That means that each of the three power switches 210, 220 and 230 is designed to carry a maximum current of one and one half amperes (1.5 A).

The output of the first power switch 210 is connected to an input of Port 1 (designated with reference numeral 130). The output of the second power switch 220 is connected to an input of Port 2 (designated with reference 140). The output of the third power switch is connected to an input of Port 3 (designated with reference numeral 150). Each of the three ports (130, 140, 150) is connected to a separate USB device (not shown in FIG. 2).

In the prior art system 200 the first power switch 210 has a current rating that is high enough to handle current for the first port (Port 1) 130. The first power switch 210 is designed to carry a maximum current of one and one half amperes (1.5 A). The second power switch 220 has a current rating that is high enough to handle current for the second port (Port 2) 140. The third power switch 230 has a current rating that is high enough to handle current for the third port (Port 3) 150. Each of the three ports (130, 140, 150) is also designed to carry a maximum current of one and one half amperes (1.5 A).

Each of the three power switches (210, 220, 230) is connected only to its respective port (130, 140, 150). In this manner the three ports (130, 140, 150) are isolated from each other. In response to control signals (not shown in FIG. 2) each of the three power switches (210, 220, 230) separately provide power to each of the three ports (130, 140, 150).

In the system 200 if one of the USB devices that is connected to one of the ports (e.g., Port 1 130) attempts to draw more current than one and one half ampere (1.5 A), then the first power switch 210 turns off. When the first power switch 210 turns off it abruptly cuts off the supply of power to the USB device that is connected to the first power (130). Power to the other ports is unaffected.

However, the system 200 dose not solve the problem that arises when one of the USB devices that is connected to one of the three ports (130, 140, 150) malfunctions and draws one and one half amperes (1.5 A) of current continuously. In addition, the power supply unit 110 for the system 200 will have an extremely high current requirement (e.g., 4.5 A @5V for three (3) ports).

To remedy the deficiencies of the above identified prior art methods there is a need in the art for an improved apparatus and method for providing power to electronic devices through power switches.

SUMMARY

The present invention provides an improved apparatus and method for providing power to electronic devices through power switches. The apparatus of the present invention comprises a power switch array that comprises adjustable current rating power switches. The plurality of current rating power switches connects a power supply unit to a plurality of device ports. A power switch array controller is provided that adjusts an adjustable current rating in each of the plurality of adjustable current rating power switches. Each of the plurality of adjustable current rating power switches is adjustable to a selected number of current values. The power switch array controller dynamically adjusts the current ratings in the adjustable current power switches as required by the current requirements of the device ports. The details of the method will be described more fully later in this patent document.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
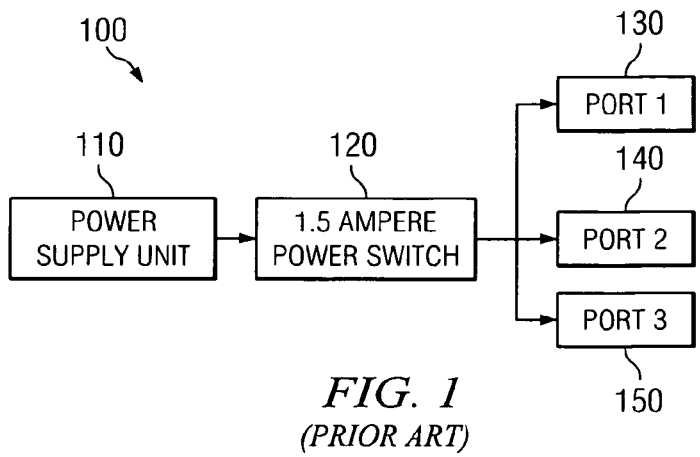
FIG. 1 illustrates a schematic diagram of a first exemplary prior art power switch system comprising a power supply unit, a power switch connected to the power supply unit and three ports connected to an output of the power switch.
Figure 2:
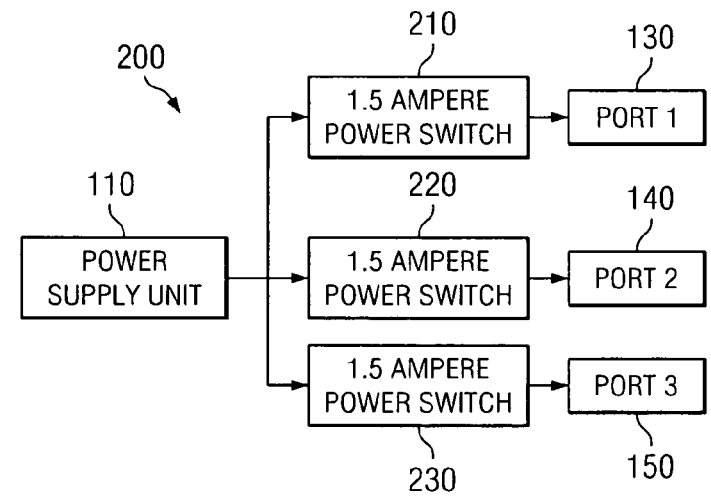
FIG. 2 illustrates a schematic diagram of a second exemplary prior art power switch system comprising a power supply unit, three power switches connected in parallel to the power supply unit, and three ports, each of which is connected to one of the three power switches.
Figure 3:
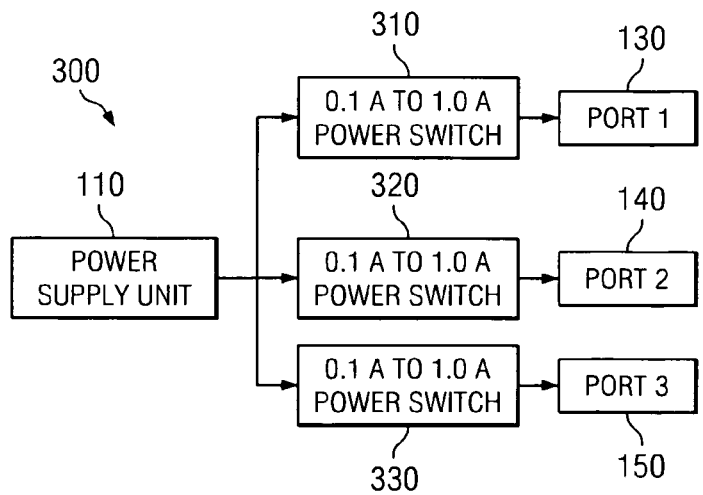
FIG. 3 illustrates a schematic diagram of an advantageous embodiment of a power switch system of the present invention comprising a power supply unit, three adjustable current rating power switches connected in parallel to the power supply unit, and three ports, each of which is connected to one of the three adjustable current rating power switches.
Figure 4:
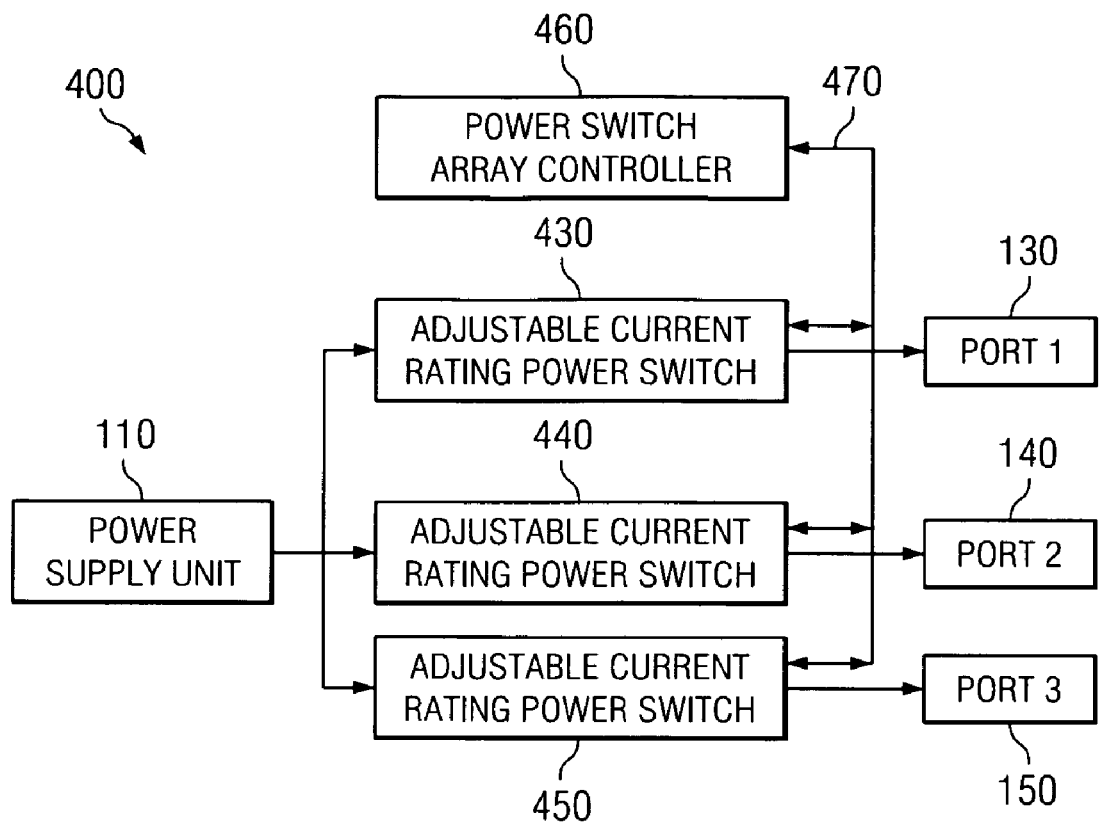
FIG. 4 illustrates a schematic diagram of an advantageous embodiment of a power switch system of the present invention comprising a power supply unit, three adjustable current rating power switches connected in parallel to the power supply unit, and three ports, each of which is connected to one of the three adjustable current rating power switches, and a power switch array controller that controls each of the three adjustable current rating power switches.
Figure 5:
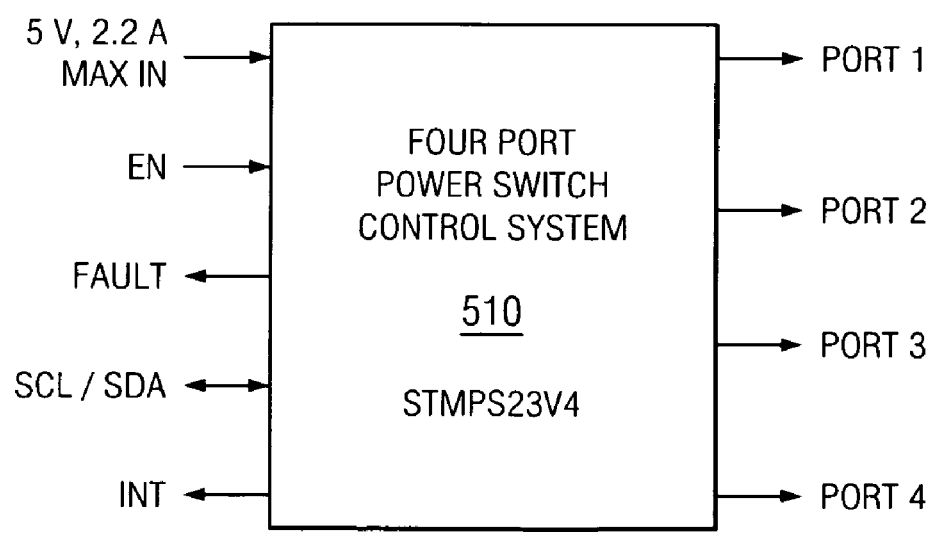
FIG. 5 illustrates a schematic diagram of an advantageous embodiment of the present invention comprising a four port power switch control integrated circuit.

FIGS. 3 through 5, discussed below, and the various embodiments described in this disclosure are by way of illustration only and should not be construed in any way to limit the scope of the claimed invention. Those skilled in the art will understand that the principles described in this disclosure may be implemented in any suitably arranged device or system.

FIG. 3 illustrates a schematic diagram of an advantageous embodiment of a power switch system 300 of the present invention. The power switch system 300 comprises a power supply unit 110, three adjustable current rating power switches (310, 320, 330) connected in parallel to the power supply unit 110, and three ports (130, 140, 150), each of which is connected to one of the three adjustable current rating power switches (310, 320, 330).

The power supply unit 110 of the system 300 provides power to the three different power switches 310, 320 and 330. The adjustable current rating power switches 310, 320 and 330 are connected in parallel as shown in FIG. 3. Each of the three adjustable current rating power switches 310, 320 and 330 has current rating that is adjustable from one tenth of an ampere (0.1 A) up to one ampere (1.0 A). That means that each of the three adjustable current rating power switches 310, 320 and 330 is able to carry any value of current in the range from one tenth of an ampere (0.1 A) up to one ampere (1.0 A).

The output of the first adjustable current rating power switch 310 is connected to an input of Port 1 (designated with reference numeral 130). The output of the second adjustable current rating power switch 320 is connected to an input of Port 2 (designated with reference 140). The output of the third adjustable current rating power switch 330 is connected to an input of Port 3 (designated with reference numeral 150). Each of the three ports (130, 140, 150) is connected to a separate USB device (not shown in FIG. 3).

In the power supply system 300 each of the three adjustable current rating power switches (310, 320, 330) is capable of limiting the current to one of four values. The four values are: (1) one hundred milliamperes (100 mA), and (2) two hundred milliamperes (200 mA), and (3) five hundred milliamperes (500 mA), and (4) one thousand milliamperes (1000 mA) or, equivalently, one ampere (1.0 A). As will be more fully described, the use of a plurality of adjustable current rating power switches enables the current rating to be dynamically reallocated as required by the operational status and current requirements of the devices to which the ports (130, 140, 150) are connected.

In response to a first control signal (not shown in FIG. 3) the first adjustable current rating power switch 310 adjusts its current rating to provide one of the four values of current (0.1 A, 0.2 A, 0.5 A, or 1.0 A) to the first port (Port 1) 130. In response to a second control signal (not shown in FIG. 3) the second adjustable current rating power switch 320 adjusts its current rating to provide one of the four values of current (0.1 A, 0.2 A, 0.5 A, or 1.0 A) to the second port (Port 2) 140. In response to a third control signal (not shown in FIG. 3) the third adjustable current rating power switch 330 adjusts its current rating to provide one of the four values of current (0.1 A, 0.2 A, 0.5 A, or 1.0 A) to the third port (Port 3) 150.

Each of the three ports (130, 140, 150) that are shown in FIG. 3 is isolated and optimally protected. The current rating requirement for the power supply unit 110 is minimal.

The range of the adjustable current rating for the power switches (310, 320, 330) has been shown as extending from one tenth of an ampere (0.1 A) to one ampere (1.0 A). This range is merely illustrative and it is understood that different values of current may be used in the current range for the adjustable current rating.

The values of current to which an adjustable current range current switch may be set are not limited to four values (e.g., 0.1 A, 0.2 A, 0.5 A and 1.0 A). The use of four values is merely illustrative. There may be more than four values or fewer than four values. In addition, it is understood that different values of current may be used in the current range for the adjustable current rating. That is, the invention is not limited to the use of the four values of 0.1 A, 0.2 A, 0.5 A and 1.0 A.

FIG. 4 illustrates a schematic diagram of an advantageous embodiment of a power switch system 400 of the present invention. Power switch system 400 comprises a power supply unit 110, three adjustable current rating power switches (430, 440, 450) connected in parallel to the power supply unit 110, and three ports (130, 140, 150), each of which is connected to one of the three adjustable current rating power switches (430, 440, 450). In addition, the power switch system 400 comprises a power switch array controller 460 that controls each of the three adjustable current rating power switches (430, 440, 450) through control lines 470.

The power switch array controller 460 comprises hardware and software elements that carry out the functions of the present invention. The power switch array controller 460 comprises a power priority system that defines the priority among the ports (130, 140, 150 in FIG. 4). Signal lines (not shown in FIG. 4) from the ports (130, 140, 150 in FIG. 4) to the power switch array controller 460 provide operational status information and current requirement information of the devices (not shown) to which the ports are connected. In response to the operational status information and current requirement information of the devices (not shown) that are connected to the ports, the power switch array controller 460 dynamically adjusts the current rating of the adjustable current rating power switches (430, 440, 450). The power switch array controller 460 also adjusts the current rating of the adjustable current rating power switches (430, 440, 450) so that the combined current through all of the switches does not exceed a pre-defined current limit value.

The power switch array controller 460 may operate in one of three modes of operation. The first mode of operation is a "first come, first serve" mode of operation for the ports. In this mode of operation each of the ports has an equal priority. The current is allocated to the ports in sequence in the order of receipt of the power request. All of the ports are allocated a minimal current rating (e.g. 0.1 A) on reset. If the power switch array controller 460 detects an overcurrent condition in one of the ports, then the power switch array controller 460 automatically "upgrades" the current rating for that port (assuming that the overall current rating does not exceed the device limit).

The second mode of operation is a "priority" mode of operation for the ports. In this mode of operation each of the ports has an assigned priority. Ports that have the highest priority will always receive the required current. The current rating on the low priority ports may be reduced if the overall current rating is insufficient.

The third mode of operation is a "manual" mode of operation for the ports. In this mode of operation the power switch array controller 460 defines a current rating for each port.

It is understood that the power switch system of the present invention is not limited to be used with only three ports. The number of ports may be less than three or greater than three. In particular, the power switch system of the present invention may be used with four ports.

FIG. 5 illustrates a schematic diagram of an advantageous embodiment of the present invention comprising an integrated circuit 510. Integrated circuit 510 comprises a four port power switch control system. The integrated circuit 510 controls power to four ports. The four ports are designated Port 1, Port 2, Port 3 and Port 4 in FIG. 5. Integrated circuit 510 may be implemented with a STMPS23V4 integrated circuit that is manufactured by STMicroelectronics, Inc.

The STMPS23V4 integrated circuit 510 comprises an array of four (4) adjustable current rating power switches (not shown in FIG. 5) of the type shown in FIG. 4. In addition, the STMPS23V4 integrated circuit 510 comprises a power switch array controller 460 as shown in FIG. 4. As shown in FIG. 5, the integrated circuit 510 has a total current rating of two and two tenths amperes (2.2 A). The integrated circuit 510 has an operating voltage range from two and seven tenths volts (2.7 V) to five and five tenths volts (5.5 V).

The four (4) adjustable current rating power switches in the STMPS23V4 integrated circuit 510 are each configurable to four values of current rating. The four values of current rating are (1) one hundred milliamperes (100 mA) or, equivalently, one tenth of an ampere (0.1 A), and (2) two hundred milliamperes (200 mA), or equivalently, two tenths of an ampere (0.2 A), and (3) five hundred milliamperes (500 mA), or equivalently, one half of an ampere (0.5 A) and (4) one thousand milliamperes (1000 mA) or, equivalently, one ampere (1.0 A).

The STMPS23V4 integrated circuit 510 comprises a four (4) port power system that is capable of simultaneously supporting up to two (2) hard disk drives and two (2) small current devices (up to one hundred milliamperes (100 mA)). The STMPS23V4 integrated circuit 510 is also able to operate in a standard configuration in which a current of five hundred milliamperes (500 mA) is provided to each of the four (4) ports.

The STMPS23V4 integrated circuit 510 also has a staggered turn on to reduce the total spike current. The STMPS23V4 integrated circuit 510 also has a configurable protection mode. The protection mode may be configured as (1) auto-retry, or (2) latched, or (3) continuous. The STMPS23V4 integrated circuit 510 may be operated in either the "first come, first serve" mode of operation for the ports, or in the "priority" mode of operation for the ports, or in the "manual" mode of operation for the ports.

The STMPS23V4 integrated circuit 510 has an "on" resistance ($R_{ON}$) of one hundred milliohms (100 mΩ) at a voltage of five volts (5 V). The STMPS23V4 integrated circuit 510 also has an I2C bus interface (400 kHz maximum).

The table below sets forth a Pin Out chart for the integrated circuit 510.

| Pin | Name | Description |
| --- | --- | --- |
| 1 | SCL | I2C Clock |
| 2 | SDA | I2C Data |
| 3 | VDIN | Digital Core Supply |
| 4 | VIN | Power Switch Input |
| 5 | VIN | Power Switch Input |
| 6 | VIN | Power Switch Input |
| 7 | A0 | I2C Address 0 |
| 8 | A1 | I2C Address 1 |
| 9 | GND | Ground |
| 10 | INT1 | Interrupt Output |
| 11 | OUT4 | Channel 4 Output |
| 12 | OUT3 | Channel 3 Output |
| 13 | OUT2 | Channel 2 Output |
| 14 | OUT1 | Channel 1 Output |
| 15 | FAULT | Active low, open collector Fault Indicator |
| 16 | EN | Enable, Active low on reset |

The table below sets forth a comparison of four different approaches to providing a power supply solution that supports high levels of current to the four (4) ports.

| | Four 1.0 A Switches | Four 0.5 A Switches | One 2.0 A Switch | STMPS23V2 Circuit |
| --- | --- | --- | --- | --- |
| Max Current | 4.0 A | 2.0 A | 2.0 A | 2.2 A |
| 1 A HDD Support | Max 4 | None | Max 2 | Max 2 |
| Catastrophic Shutdown | Possible | Isolated | Possible | Isolated |
| Protection of <= 500 mA device | No | Yes | No | Yes |
| I2C Control/ Monitoring | No | No | No | Yes |
| Threshold Current Adjustment | No | No | No | Yes |

The comparison in the table above shows that the integrated circuit 510 of the present invention provides the best set of features for providing a power supply solution that supports high levels of current to four ports. The STMPS23V4 integrated circuit 510 (1) provides a maximum current of two and two tenths amperes (2.2 A), and (2) supports a maximum of two (2) one ampere (1 A) hard disk drives, and (3) isolates catastrophic shutdown, and (4) provides protection for devices that operate with current that is less than or equal to five hundred milliamperes (500 mA), and (5) provides I2C control/monitoring, and (6) provides threshold current adjustment.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "controller" and "control circuit" mean any device, system, or part thereof that controls at least one operation. A controller or control circuit may be implemented in hardware, firmware, or software, or a combination of at least two of the same. It should be noted that the functionality associated with any particular controller or control circuit may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus that provides power to an electronic device, the apparatus comprising:
    a power input configured to receive power from a power supply;
    a plurality of device ports;
    an array of adjustable current rating power switches, each adjustable current rating power switch coupled to the power input and to a different one of the plurality of device ports; and
    a power switch array controller configured to alter an adjustable current rating in each of the plurality of adjustable current rating power switches.

2. The apparatus as set forth in claim 1, wherein the power switch array controller is configured to independently alter the adjustable current rating in each of the plurality of adjustable current rating power switches.

3. The apparatus as set forth in claim 1, wherein the power switch array controller is configured to limit combined current through the plurality of adjustable current rating power switches so that the combined current does not exceed a pre-selected maximum current value.

4. The apparatus as set forth in claim 1, wherein each of the plurality of adjustable current rating power supply switches is connected in parallel to the power input.

5. The apparatus as set forth in claim 4, wherein a current rating of each of the plurality of adjustable current rating power switches is adjustable to any one of a selected number of current values.

6. The apparatus as set forth in claim 5, wherein the selected number of current values is four and the four current values are selected as one tenth of an ampere, two tenths of an ampere, five tenths of an ampere and one ampere.

7. The apparatus as set forth in claim 6 wherein the apparatus is configured to provide protection for devices that operate with a current that is less than or equal to five hundred milliamperes (500 mA).

8. The apparatus as set forth in claim 6 wherein the apparatus is configured to provide one of: $I^2C$ control/monitoring and threshold current adjustment.

9. A method for providing power to an electronic device, the method comprising:
    receiving power at an array of adjustable current rating power switches;
    providing power from each of the adjustable current rating power switches to an associated device port; and
    setting an adjustable current rating in each of the adjustable current rating power switches using a power switch array controller.

10. The method as set forth in claim 9, further comprising:
    adjusting the adjustable current rating independently in each of the plurality of adjustable current rating power switches.

11. The method as set forth in claim 9, wherein
    the plurality of adjustable current rating power supply switches are coupled in parallel.

12. The method as set forth in claim 11, wherein the selected number of current values is four and the four current values are selected as one tenth of an ampere, two tenths of an ampere, five tenths of an ampere and one ampere.

13. The method as set forth in claim 9, further comprising:
    providing $I^2C$ control/monitoring; and
    providing threshold current adjustment.

14. A system that provides power to an electronic device, the system comprising:
    a power supply;
    a plurality of device ports; and
    a power switch array, comprising:
        an array of adjustable current rating power switches, each adjustable current rating power switch coupled to the power supply and to an associated one of the plurality of device ports; and
        a power switch array controller adapted to adjust an adjustable current rating in each of the adjustable current rating power switches.

15. The system of claim 14, wherein the power switch array controller is adapted to limit the combined current through the plurality of adjustable current rating power switches so that the combined current does not exceed a pre-selected maximum current value.

16. The system of claim 14, wherein each of the plurality of adjustable current rating power supply switches is connected in parallel to the power supply.

17. The system of claim 14, wherein a current rating of each of the plurality of adjustable current rating power switches is adjustable to a selected number of current values.

18. The system of claim 17, wherein the selected number of current values is four and the four current values are selected as one tenth of an ampere, two tenths of an ampere, five tenths of an ampere and one ampere.

19. The system of claim 18, wherein the power switch array controller is adapted to provide one of: I2C control/monitoring and threshold current adjustment.

20. The system of claim 14, wherein the power switch array controller is coupled to at least one of the plurality of device ports and is adapted to adjust the adjustable current rating in the adjustable current rating power switch associated with the device port in response to information received from the device port.

* * * * *